US011240337B2

United States Patent
Miranda-Steiner et al.

(10) Patent No.: US 11,240,337 B2
(45) Date of Patent: *Feb. 1, 2022

(54) IMAGE TRANSFORMATION IN HYBRID SOURCING ARCHITECTURE

(71) Applicant: Microsoft Technology Licensing, LLC, Redmond, WA (US)

(72) Inventors: Jose Emmanuel Miranda-Steiner, Seattle, WA (US); Victor Magidson, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/504,703

(22) Filed: Jul. 8, 2019

(65) Prior Publication Data

US 2019/0335013 A1 Oct. 31, 2019

Related U.S. Application Data

(63) Continuation of application No. 15/365,761, filed on Nov. 30, 2016, now Pat. No. 10,375,196.

(Continued)

(51) Int. Cl.
*H04L 29/08* (2006.01)
*G06F 16/51* (2019.01)
(Continued)

(52) U.S. Cl.
CPC .......... *H04L 67/2842* (2013.01); *G06F 16/51* (2019.01); *G06T 5/008* (2013.01);
(Continued)

(58) Field of Classification Search
CPC . H04L 67/16; H04L 67/1097; H04L 67/2842; G06T 5/10; G06T 5/008;
(Continued)

(56) References Cited

U.S. PATENT DOCUMENTS 8,244,874 B1 * 8/2012 Thireault .............. G06F 9/5072
709/226
8,775,648 B1 * 7/2014 Cassidy .................. H04W 4/60
709/229

(Continued)

FOREIGN PATENT DOCUMENTS

| CN | 101662454 A | 3/2010 |
| CN | 104601534 A | 5/2015 |
| CN | 105556931 A | 5/2016 |

OTHER PUBLICATIONS

"First Office Action and Search Report Issued in Chinese Patent Application No. 201780047133.6", dated Sep. 16, 2020, 13 Pages.

(Continued)

*Primary Examiner* — Oanh Duong
(74) *Attorney, Agent, or Firm* — Newport IP, LLC; Scott Y. Shigeta

(57) ABSTRACT

Image transformation for use in a hybrid distribution architecture with improved performance characteristics is provided herein. The hybrid distribution architecture provides content to clients via a dual source system using a central cloud service and a Content Distribution Network, which uses the cloud service as its source. A client that requests a new rendition of an image provided by a chosen source of the hybrid distribution architecture will have that request handled by the source, and the source may maintain that rendition for future provision. By allowing the client to choose the source and letting that source handle the request, rather than requiring a central service hand the request, the amount of data needed to be transmitted is reduced and the speed of provision of content, modified or not, is improved for the client.

20 Claims, 7 Drawing Sheets

Related U.S. Application Data

(60) Provisional application No. 62/368,771, filed on Jul. 29, 2016.

(51) Int. Cl.
*H04N 21/2183* (2011.01)
*H04N 21/2343* (2011.01)
*H04N 21/61* (2011.01)
*H04N 21/81* (2011.01)
*G06T 5/00* (2006.01)
*G06T 5/10* (2006.01)

(52) U.S. Cl.
CPC .......... *G06T 5/10* (2013.01); *H04L 67/1097* (2013.01); *H04L 67/16* (2013.01); *H04N 21/2183* (2013.01); *H04N 21/234309* (2013.01); *H04N 21/6125* (2013.01); *H04N 21/8153* (2013.01); *G06T 2207/20182* (2013.01); *G06T 2207/20201* (2013.01)

(58) Field of Classification Search
CPC . G06T 2207/20201; G06T 2207/20182; G06F 16/51; H04N 21/2183; H04N 21/234309; H04N 21/6125; H04N 21/8153
See application file for complete search history.

(56) References Cited

U.S. PATENT DOCUMENTS

| | | | | |
|---|---|---|---|---|
| 10,116,729 | B2* | 10/2018 | Joe | H04L 65/60 |
| 10,375,196 | B2* | 8/2019 | Miranda-Steiner | H04L 67/1097 |
| 2005/0183121 | A1* | 8/2005 | Kim | H04N 21/4755 725/46 |
| 2008/0091845 | A1* | 4/2008 | Mills | H04L 67/2823 709/246 |
| 2011/0137973 | A1* | 6/2011 | Wei | H04L 67/1008 709/202 |
| 2012/0011267 | A1* | 1/2012 | Ma | H04L 65/4076 709/231 |
| 2012/0198075 | A1* | 8/2012 | Crowe | H04L 67/2885 709/226 |
| 2016/0127466 | A1* | 5/2016 | Albrecht | H04L 67/32 709/219 |
| 2017/0302600 | A1* | 10/2017 | Kishore | H04W 4/06 |

OTHER PUBLICATIONS

"Office Action Issued in European Patent Application No. 17755309.6", dated Jan. 24, 2020, 4 Pages.

"Second Office Action Issued in Chinese Patent Application No. 201780047133.6", dated Jul. 5, 2021, 11 Pages.

\* cited by examiner

MOBILE COMPUTING DEVICE

IMAGE TRANSFORMATION IN HYBRID SOURCING ARCHITECTURE

CROSS-REFERENCES TO RELATED APPLICATIONS

This application is a continuation of U.S. application Ser. No. 15/365,761, filed Nov. 30, 2016, now U.S. Pat. No. 10,375,196, which claims the benefit of U.S. Provisional Application No. 62/368,771 filed Jul. 29, 2016, the disclosures of which are hereby incorporated by reference in their entirety.

BACKGROUND

When consuming images, users of computing devices often desire the images in a different format than originally provisioned. For example, a user of a computing device with a small display may wish for a reduced size image, while a user of a computing device with a large display may wish for an increased size image. Similarly, a colorblind user may wish for a color-corrected image or an artistic user may wish for an effect or overlay to be applied to the image. A computing device will apply various transformations to the original image to yield the desired image, which is often a processor intensive task and increasingly is done by an image transformation service that is provided on a different computing device than the computing device consuming the content. By using an external image transformation service, users may conserve battery life on mobile computing devices and make use of more robust graphical processors and software than their devices include. However, using an external image transformation service uses bandwidth to transmit the image back and forth between computing devices, which can be exacerbated when a Content Distribution Network (CDN) provides the image to the user, and must rely on the image source to handle the request to the image transformation service.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

The present disclosure is related to reducing the bandwidth, latency, and storage requirements for using an external image transformation service to handle image transforms for a client device in conjunction with a hybrid sourcing architecture comprising a cloud service and a Content Distribution Network (CDN). The client device may freely request the original image from either the cloud service or the CDN and request via the chosen source to transform the image. The chosen source will handle the request to the image transformation service and return the transformed image to the client device, and may store or cache the transformed image for later use by the same or a different client device.

By enabling the chosen source to handle the request to the image transformation service, instead of always relying on the image source to handle the request, the amount of data that the hybrid architecture needs to transmit to respond to client requests is reduced. Further, by reducing the amount of data that need to be transmitted within the architecture, the speed at which the client device receives the transformed image is improved.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
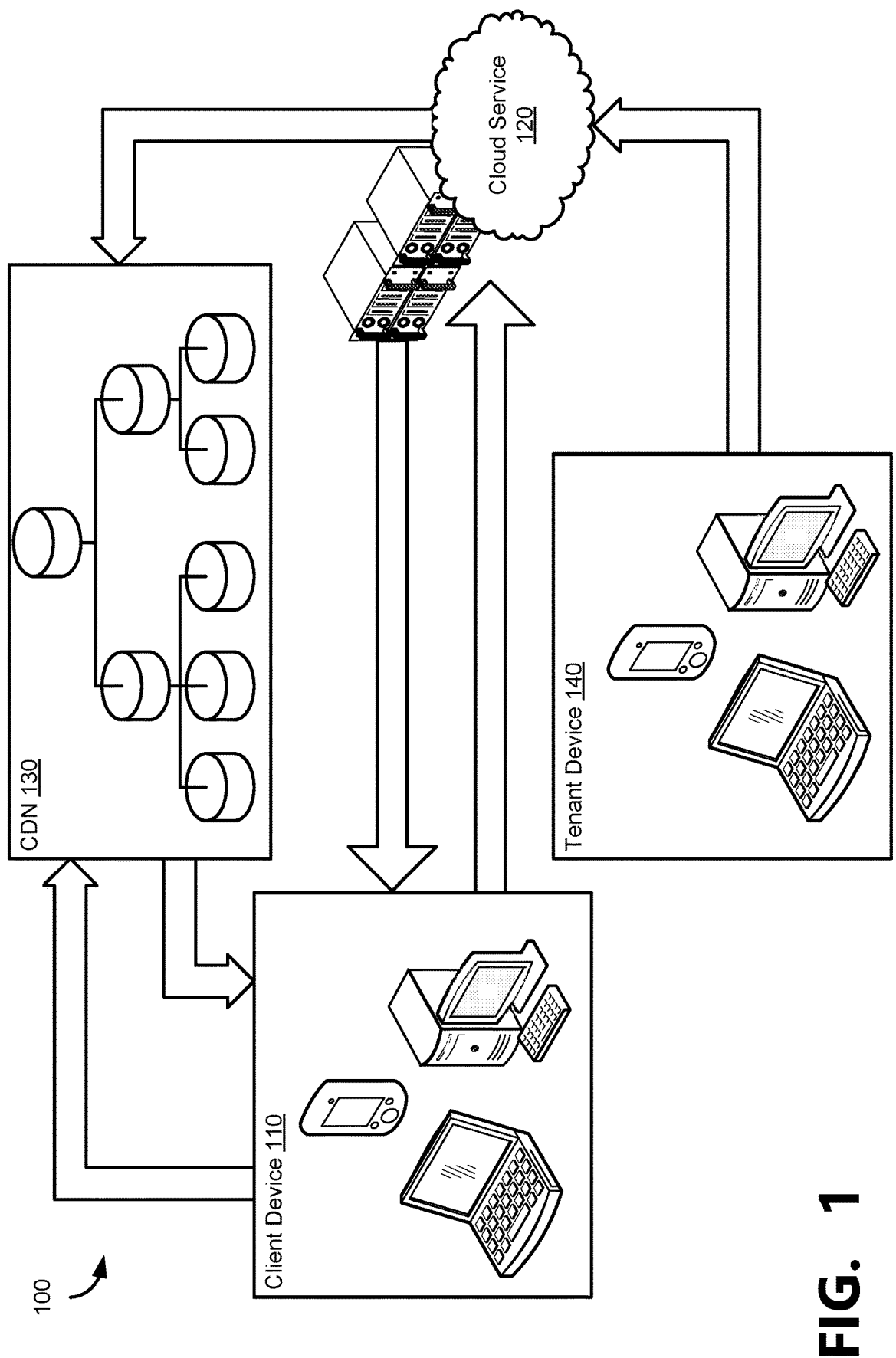
FIG. 1 illustrates an example hybrid architecture with which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

When an image is provided as a content asset in an HTML (Hypertext Markup Language) or other document using a referential structure, it will be called out as an element in that document. Although references are primarily given in relation to an HTML structure, one of ordinary skill in the art will be able to apply the teaching provided herein to other structured languages, such as for example, XML (Extensible Markup Language), JSON (JavaScript Object Notation), etc., and the present disclosure is not limited to documents that use HTML.

Within HTML, the <img> tag defines an element as an image, and it has two required attributes: source (src) and alternate text (alt). For example, to create a holding space for the image "example.gif" in a webpage with the alttext of "example", the HTML structure will include the text of: <img src="example.gif" alt="example">. Depending on the version of HTML used by the developer and the application consuming the webpage, various other attributes for the image may be set within the HTML document to affect the presentation of the image to the client. For example, height, width, hspace, and vspace may be defined within the <img> tag to modify the aspect ratio of the image.

The client may also specify additional modifications to apply to the image independently of what is called out in the image tag. For example, the client may request that a hue, saturation, tone, or channel filter be applied to the image, a shadow effect, a transparency effect, a three-dimensional effect, an overlay, a morph effect, an enlarge/shrink effect, a crop effect, a quality reduction, a compression change, or other effect that is not natively supported by HTML or is inefficiently provided (in terms of computational resource expenditure) by HTML. When the desired image modification effect is not natively supported in the structured document, the client may perform the modification locally, request a third-party to perform the modification, or request that the service providing the image provide a modified version of the image. When attempting to use a remote device to handle modifying the image (i.e., the image provider or the third-party), the client may specify the desired modifications prior to receiving the image or after receiving the image.

FIG. 1 illustrates an example hybrid architecture 100 with which the present disclosure may be practiced. As illustrated, a client device 110 is operable to communicate requests to the cloud service 120 and to receive content, including images, from a cloud service 120 and a CDN 130. The cloud service 120 is in communication with a tenant device 140, by which the content provider may upload or remove content from cloud service 120 and may set how that content is to be made available to the client devices 110. The cloud service 120 is also in communication with the CDN 130 to enable or disable the CDN 130 as an available content source to the client device based on commands from the tenant device 140.

A hybrid distribution architecture 100 makes use of a cloud service 120 and a CDN 130 to provide clients with requested content quickly and with lower overhead than a cloud service-only solution, but also provides tenants with greater control over the access to that content than a CDN-only solution. The systems and methods for enabling the use of the hybrid distribution architecture 100 are described in greater detail in co-pending application US 62/368,739. The cloud service 120 and the CDN 130 comprise one or more computing devices configured to receive content from a tenant and share it via a network (e.g., the Internet) with clients that request it. The cloud service 120 is a structured service that provides a centralized source for content that may include access controls to that content. The CDN 130 is a public content provider that uses the cloud service 120 as its source and distributes the content over a wider geographic area than the cloud service 120, to provide content faster and with less overhead than the cloud service 120. The tenant seeking to distribute content is enabled to set which content assets are distributed via the cloud service 120 and which are distributed by the CDN 130, and may quickly enable or disable the CDN 130 as an available source for content assets without needing to configure how the content is distributed in the CDN 130 and with minimal impact to the client.

The client device 110 and tenant device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A, and 6B. Client devices 110 are operated by clients, who may be humans or automated systems (e.g., "bots") that request content. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft Corp. of Redmond, Wash., respectively) may request content in response to or in anticipation of queries from a human user. Similarly, tenant devices 140 are operated by tenants, who may be humans or automated systems that provide and manage content that is available for clients to request. In various aspects, the tenant and the client may be the same entity, such as, for example, when a developer posts a webpage (as a tenant) and then verifies that the webpage displays properly by visiting (as a client) the live version of that webpage.

The cloud service 120 stores content for the tenant to provide to the client over a network (e.g., the Internet). In various aspects, the cloud service 120 may be operated by the tenant or by a third party on behalf of the tenant at the tenant's direction. The cloud service 120 may be a structured storage service or collaboration tool that is operable to restrict what content is available to certain clients. For example, a tenant may post content that is publically available so that any potential client may request and receive that content, but a tenant may also post content that is only available to a restricted set of potential clients (e.g., private to one entity, shared among a selected whitelist of entities, blocked from sharing according to a blacklist of entities). For example, one or more content items may be hosted in cloud services 120 such as ALFRESCO™ (available from Alfresco Software, Inc. of Atlanta, Ga.), HUDDLE™ (available from Huddle, Inc. of London, UK), GOOGLE DRIVE™ (available from Alphabet, Inc. of Mountain View Calif.), WORDPRESS™ (available from Automattic, Inc. of San Francisco, Calif.), SHAREPOINT® (available from Microsoft Corp. of Redmond, Wash.), but may include other enterprise or personal content management systems.

Content may be organized within the cloud service 120 according to various "libraries," "folders," or "sites" that may have various permission levels. The cloud service 120, when a request for content is received, will determine whether the requesting client is associated with the appropriate permission level to access the requested content, and may require the client device 110 to provide authentication (e.g., an authentication token, a username/password pair) before the requested content is transmitted to the client device 110.

A CDN 130 comprises a series of computing devices arranged in a tiered structure. Content is retrieved from a source (also referred to as a headend) and is cached in progressively lower tiers of computing devices comprising the CDN 130 until the content is cached on an edge server for transmission to a client device 110 requesting that content. The edge servers comprising the CDN 130 are widely distributed geographically so that content can be served to clients with less lag than a single centrally located content source; improving the speed at which content requests are responded to.

When an edge server does not have the content requested by a client, it will request that content from the next higher tier in the CDN 130, which in turn may forward the request to progressively higher tiers until a content source is reached, and the content is distributed through the chain of intermediary servers for provision to the edge server and is transmitted to the client device 110. The servers comprising the CDN 130 may be pre-populated by the administrators of the CDN 130 in anticipation of client requests or may be populated in response to client requests; only those edge servers (and the servers in tiers above them) in communication with clients who have made requests for a given content asset will store the given content asset.

Each server comprising the CDN 130 may cache the content for a different length of time that may be configured by a tenant employing the CDN 130 or an administrator of the CDN 130 to free storage resources when the content item has not been requested for a given length of time or to comply with the retention policy for the content asset. For example, if no clients request a given content item from a first edge server for n days, the content item may be marked to be overwritten on the first edge server or may be deleted from the first edge server, but a second edge server may maintain the content item in its cache independently of the first edge server. Additionally, the next higher tier (from which the first edge server received the content item) may retain the content item for (n+1) days without a client or edge server request for the content item to reduce the amount of data that need to be transferred between tiers of the CDN 130 if the content is requested again from an edge server after n days since the last request.

A publically available CDN 130, unlike the cloud service 120, does not need to authenticate a given client's permission levels; any requesting client with knowledge of a given Uniform Resource Locator (URL) hosted in the CDN 130 can receive the content asset associated with that URL. In some aspects, the CDN 130 may be managed by the tenant, but in other aspects may instead be a service provided by a third party to distribute the tenant's content more quickly to clients, who may be spread across multiple locations. Examples of parties that provide CDNs 130 include, but are not limited to: Akamai Techs., Inc. of Cambridge, Mass.; Limelight Networks, Inc. of Tempe, Ariz,; and Level 3 Communications, Inc. of Broomfield, Colo.

As will be appreciated, by not performing access control operations, the CDN 130 may provide content with less overhead (e.g., without performing authentication) than the cloud service 120, thus expending fewer processing resources and providing the content faster to the client device 110 than the cloud service 120 can. Content assets may take time to propagate through the tiers of a CDN 130 however, and individual content assets may be unavailable from the CDN 130 due to the sensitivity of the content asset (a privacy or security policy) or the frequency at which it is updated; the CDN 130 is better suited to static content assets that the tenant does not mind being exposed publically, whereas the cloud service 120 is better suited to dynamic content assets or content assets that the tenant does not want to be exposed publically. The hybrid system disclosed herein allows the tenant to tailor which content assets are available from each of the cloud service 120 and the CDN 130 to thereby make use of the advantages of each content provisioning system to improve the efficiency and speed of the systems used in accessing content.

The tenant may signal from the tenant device 140 what content assets that are stored in the cloud service 120 are allowed to be shared via the CDN 130. In response, the CDN 130 uses the cloud service 120 as its source from which to cache and distribute the assets to appropriate tiers within the CDN 130. The tenant may signal from the tenant device 140 when one or more content assets are no longer allowed to be shared via the CDN 130 by transmitting a cache invalidation request to the CDN 130 and removing the cloud service 120 as a source for the given content assets in the CDN 130.

The client device 110 accesses the content via a web browser or other application that requests content items according to URLs associated with the content items. As will be appreciated, web browsers often have limits on the number of concurrent requests for content that they may make to a single source, and content requests can often depend from one another; making small improvements to the speed for retrieving an individual content asset have a large impact on content items comprised of many assets. For example, a client accessing a website as a content item may request the webpage itself, which includes the HTML source for the webpage as well as multiple design elements such as JavaScript files, cascading style sheets (CSS), embedded videos, audio files, images, etc., which all need to be requested from their associated source, and these elements may further specify other content assets that will later need to be requested (e.g., an image specified within a CSS) for the client to fully receive the content item.

For an image to be hosted in a hybrid architecture 100 and accessible to the client device 110 via either the cloud service 120 or the CDN 130, the client device 110 may be provided a configurable URL in an image definition that may point to the given image as a content asset at either the cloud service 120 or the CDN 130. The client device 110 may receive the configurable URL that points to one source or the other and determine, based on user or system preferences and client logic to verify the validity of the converted URL, whether to convert the URL to point to the other source. Once a source has been chosen, the client device 110 may then address future requests for the content item in its original form or in a modified form to that source.

Figure 2:
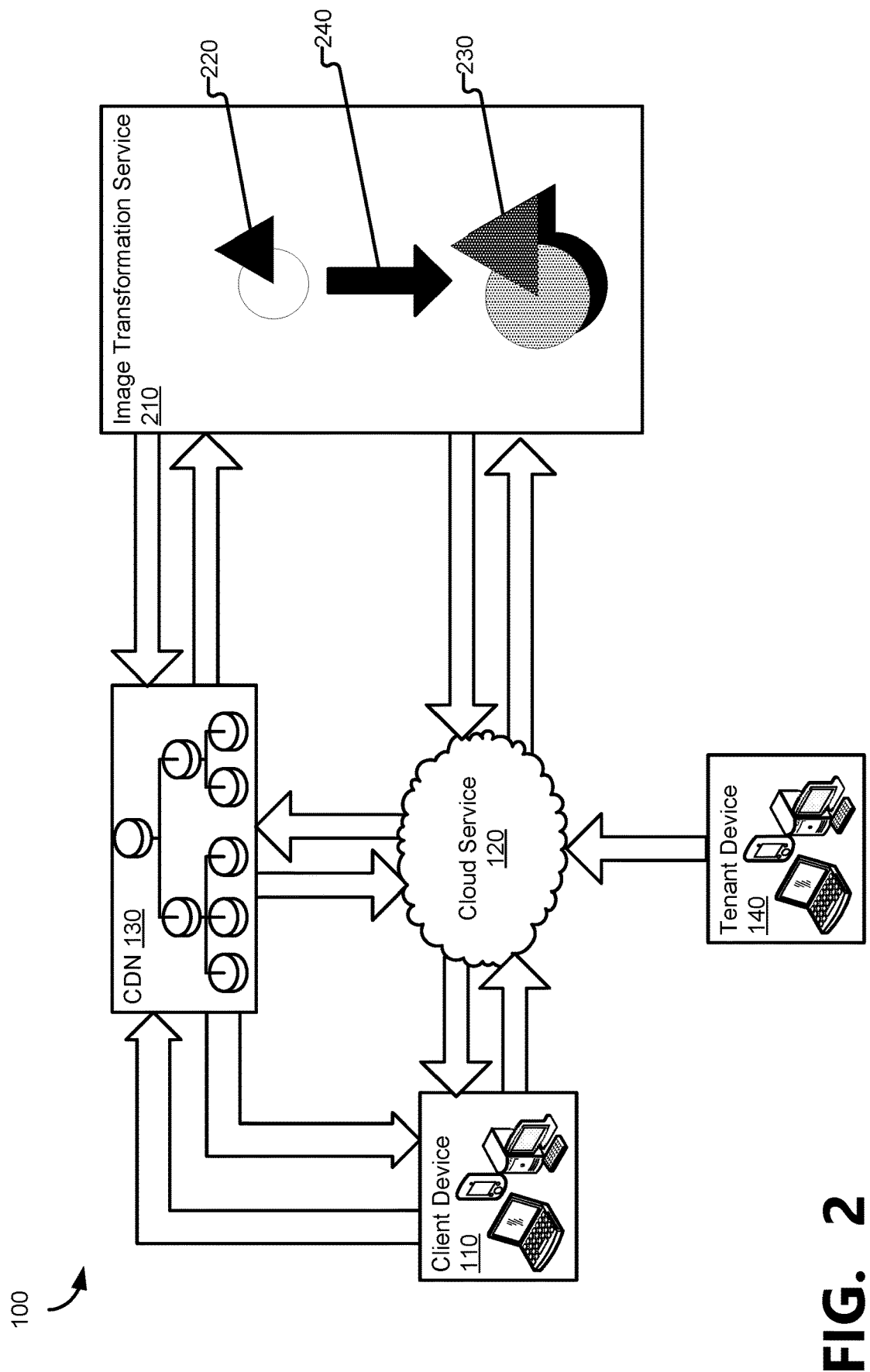
FIG. 2 illustrates components of the hybrid distribution architecture using an image transformation service to respond to a client request for an image transformation.

FIG. 2 illustrates components of the hybrid distribution architecture 100 using an image transformation service 210 to respond to a client request for an image transformation. By using an image transformation service 210 with either source in the hybrid distribution architecture 100 to respond to user requests for transformed images 230, the tenant may provide one original image 220 from the tenant device 140 to the cloud service 120 and avoid having to pre-produce several transformed images 230 based on the original image 220, which may or may not be desired by the clients. On-the-fly requests handled by the image transformation service 210 thus may reduce the expenditure of processing resources and the use of storage space compared to pre-production of transformed images.

The image transformation service 210 is provided by a computing device, such as, for example, a server, that is in communication with the cloud service 120 and the CDN 130 to handle requests for image transformation forwarded from client devices 110 when the content source lacks the requested image. The image transformation service 210 receives the request and the original image 220 from the source that the client device requested the modified content asset from and performs the requested modification on the original image 220 to produce the transformed image 230. The transformed image 230 is then transmitted back to the source that provided the original image 220 to the image transformation service 210 and the source will respond to the request from the client device 110 by forwarding the transformed image 230.

In aspects where the client device 110 requests (due to user or system preferences) a transformed image 230 from the cloud service 120 instead of the CDN 130, where the original image 220 is also available, the cloud service 120 may specify to the image transformation service 210 to return the transformed image 230 to a location associated as a source for the CDN 130, so that the transformed image 230 may also be cached by the CDN 130 for use by other clients. In other aspects, the cloud service 120 may receive the transformed image 230 from the image transformation service 210 at a non-shared location in the cloud service 120 and determine that the original image 220 is also present in a location associated as a source for the CDN 130, and copy or move the transformed image 230 to that location so that the transformed image 230 may also be cached by the CDN 130.

The image transformation service 210 may perform one or more of various transforms on the original image 220 that are requested by the client. Example transforms that a client may request include, but are not limited to: applying/removing a hue filter, applying/removing a saturation filter, applying/removing a luminosity filter, applying/removing a color channel filter, adjusting a transparency, applying/removing a shadow effect, applying/removing a blur or pixilation effect, applying/removing an overlay, softening/sharpening the original image 220, adjusting brightness and contrast, applying/removing an artistic effect (e.g., a textile pattern, a stoneware pattern, a film grain pattern, a crayon drawing style, a watercolor style, a sepia tone style, a colorblind mode, a morph effect), resizing the original image 220, cropping the original image 220, providing a border to the original image 220, color swapping the original image 220, tilting or rotating the perspective of the original image 220, changing the compression rate of the image, changing the file format of the image, etc. As will be appreciated, an effect to transform an original image 220 may be applied to all of the original image 220 or to only a portion of the original image 220, such as, for example, to apply a color channel filter to remove "red eyes" from photographs where the filter is only applied to areas identified as corresponding to eyes. As will be further appreciated, the request may be made to encompass multiple images (e.g., to transform a video file, an animated GIF, all the images referenced by a webpage) and may also be applied to sound files.

By responding to client requests, and storing or caching the resulting transformed images 230, the hybrid distribution architecture 100 may provide and hold an arbitrary number of images for provision, and those images will be of use to at least one client. This allows for clients with similar use cases (e.g., the same form factor viewing device, similar viewing requirements) to make use of a previous request from another client so that the image transformation service 210 does not need to be invoked when the source already includes a responsive transformed image 230. It also allows the tenant to supply a single original image 220 without having to predict what variations of that image will be useful to clients and to expend the processing resources and storage space to host additional renditions of the original image 220.

In various aspects, the sources of the images for the client devices 110 (i.e., the cloud service 120 and the CDN 130) may maintain a transformation array as a database structure that identifies a given transformed image 230 that meets the requirements of a given request so that the sources may identify when a request asks for a transformed image 230 that is already stored or cached. The transformation array may be periodically updated as content assets are added to or removed from the source based on an asset lifetime in that source. Additionally, the transformation array may be used to provide a transformed image 230 as an intermediary image instead of the original image 220 to the image transformation service 210 when the client has requested multiple transforms (e.g., apply a first filter and resize the original image 220) to be applied to a single image. Moreover, the transformation array may be used by the CDN 130 in response to a tenant revoking permissions for a given original image 220 to be shared via the CDN 130 (e.g., a cache clear command) to identify the transformed image 230 renditions of that original image 220 and likewise delete or mark for overwriting the related renditions.

Figure 3:
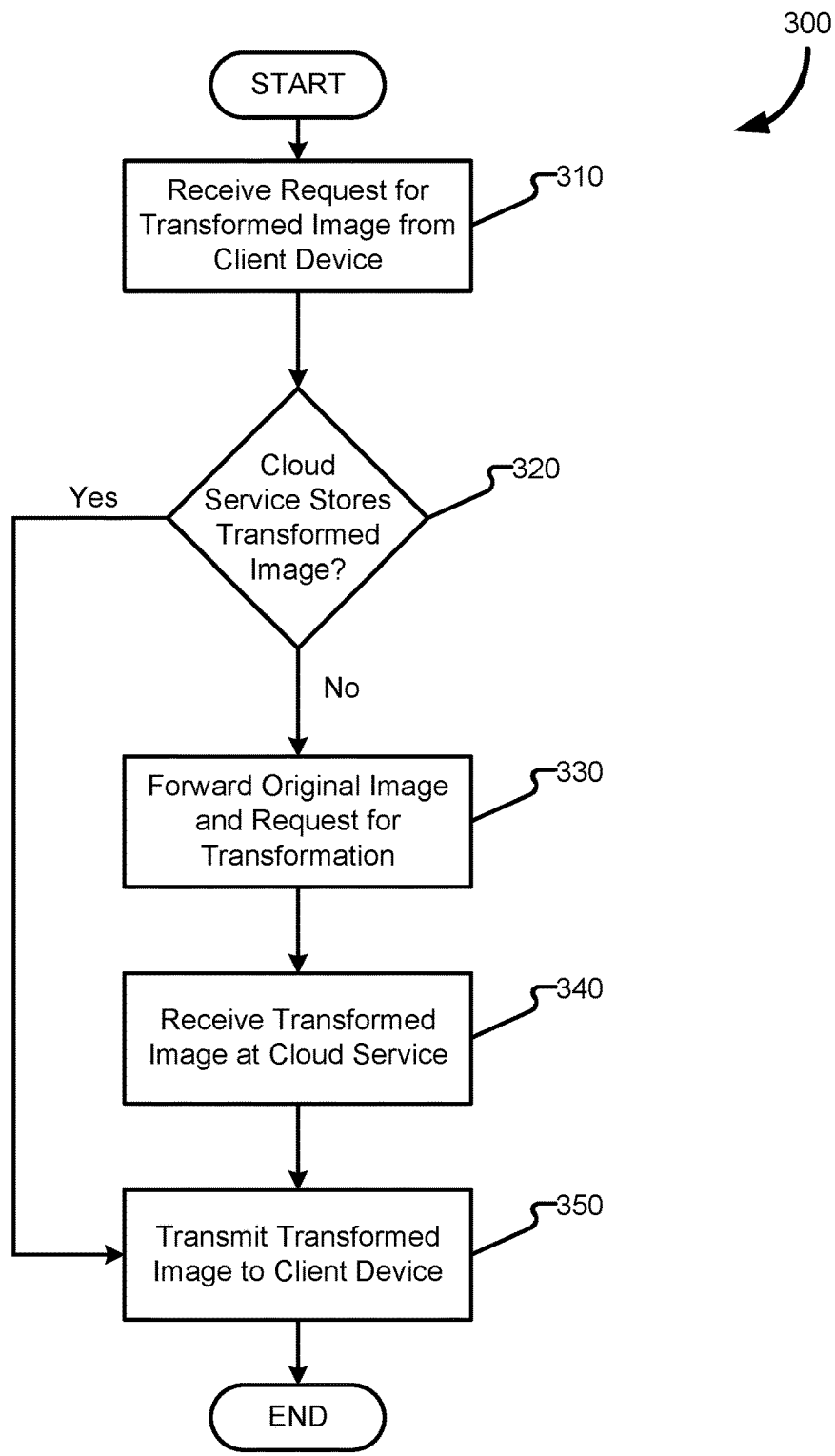
FIG. 3 is a flow chart showing general stages involved in an example method for handling requests from client devices to transform images when using the cloud service of a hybrid distribution architecture.

FIG. 3 is a flow chart showing general stages involved in an example method 300 for handling requests from client devices 110 to transform images when using the cloud service 120 of a hybrid distribution architecture 100. Method 300 is used in the hybrid distribution architecture 100 when the image is not available from the CDN 130 or the client device 110 prefers to use the cloud service 120. Method 300 is also used when the CDN 130 is not yet enabled as a content source for clients or has been disabled as a content source for clients for a given image or library of images.

Method 300 begins at OPERATION 310 when a request for a transformed image 230 is received from a client device 110 by the cloud service 120. In response to the cloud service 120 receiving the request for image transformation, the cloud service 120 determines at DECISION 320 whether it already stores the transformed image 230. When the cloud service 120 already stores the transformed image 230, method 300 proceeds to OPERATION 350, otherwise, method 300 proceeds to OPERATION 330.

At OPERATION 330 the cloud service 120 forwards the request and the original image 220 to the image transformation service 210, and at OPERATION 340, the cloud service 120 receives the transformed image 230 from the image transformation service 210. Method 300 then proceeds to OPERATION 350, where the cloud service 120 transmits the transformed image 230 image to the client device 110. Method 300 may then conclude.

Figure 4:
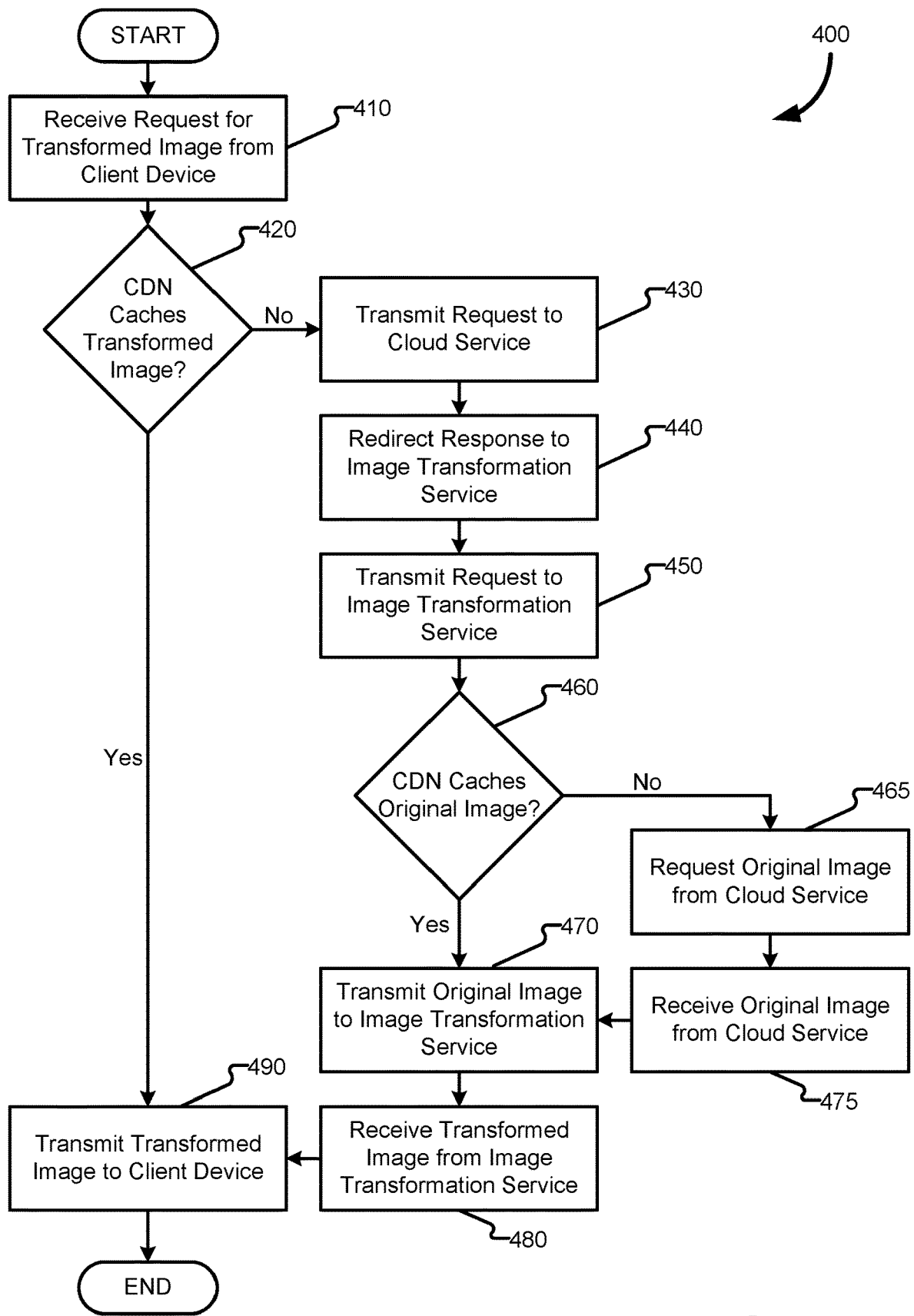
FIG. 4 is a flow chart showing general stages involved in an example method for handling requests from client devices to transform images when using the CDN of a hybrid distribution architecture.

FIG. 4 is a flow chart showing general stages involved in an example method 400 for handling requests from client devices 110 to transform images when using the CDN 130 of a hybrid distribution architecture 100. As will be appreciated, the benefits of reduced overhead (due to not having to perform client authentication, etc.) and faster response time to the client from the CDN 130 compared to the cloud service 120 are realized in method 400, such that the client will receive the transformed image 230 seamlessly; after sending the request to the CDN 130 that provides content to the client, the CDN 130 and cloud service 120 will handle the transformation without further client input.

Method 400 begins at OPERATION 410 when a request for a transformed image 230 is received from a client device 110 by the CDN 130. In response to the CDN 130 receiving the request for image transformation, the CDN 130 determines at DECISION 420 whether it already has cached the transformed image 230. When the CDN 130 already caches the transformed image 230, method 400 proceeds to OPERATION 490 to transmit the cached transformed image 230 to the client device 110, otherwise, method 400 proceeds to OPERATION 430.

At OPERATION 430 the CDN 130 transmits the request for the transformed image 230 to the cloud service 120, which is set as the source for the CDN 130. The cloud service 120 handles the request for the content asset that the CDN 130 does not have by responding to the CDN 130 at OPERATION 440 with a redirect response (e.g., a 302, 303, or 307 HTTP response) indicating that the image transformation service 210 should receive the request. Method 400 proceeds to OPERATION 450, where the CDN 130 requests the transformed image 230 from the image transformation service 210, which will request the original image 220 from the CDN 130. At DECISION 460, the CDN 130 determines whether it has cached the original image 220 and method 400 will proceed to OPERATION 465 when the CDN 130 has not cached the original image 220, and will proceed to OPERATION 470 when the CDN 130 has cached the original image 220.

In response to determining that the CDN 130 has not cached the original image 220, the CDN 130 will request the original image 220 from its source; the cloud service 120 at OPERATION 465. The cloud service 120 responds at OPERATION 475 by transmitting the original image 220 to the CDN 130 for caching and distributing throughout the CDN 130 according to the CDN's policies. Method 400 then will proceed to OPERATION 470.

At OPERATION 470 the CDN 130 transmits the original image 220 to the image transformation service 210 to be transformed according to the client request. The CDN 130 receives the transformed image 230 at OPERATION 480 from the image transformation service 210 and transmits the transformed image 230 to the client device 110 at OPERATION 490. The CDN 130 may cache the transformed image 230 for later distribution for a period of time equivalent to how long it caches the original image 220 or another set period of time based on requests for the transformed imaged 230 so that future requests from the client device 110 or other client devices 110 may receive the transformed image 230 in response to DECISION 420. Method 400 may conclude after OPERATION 490.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
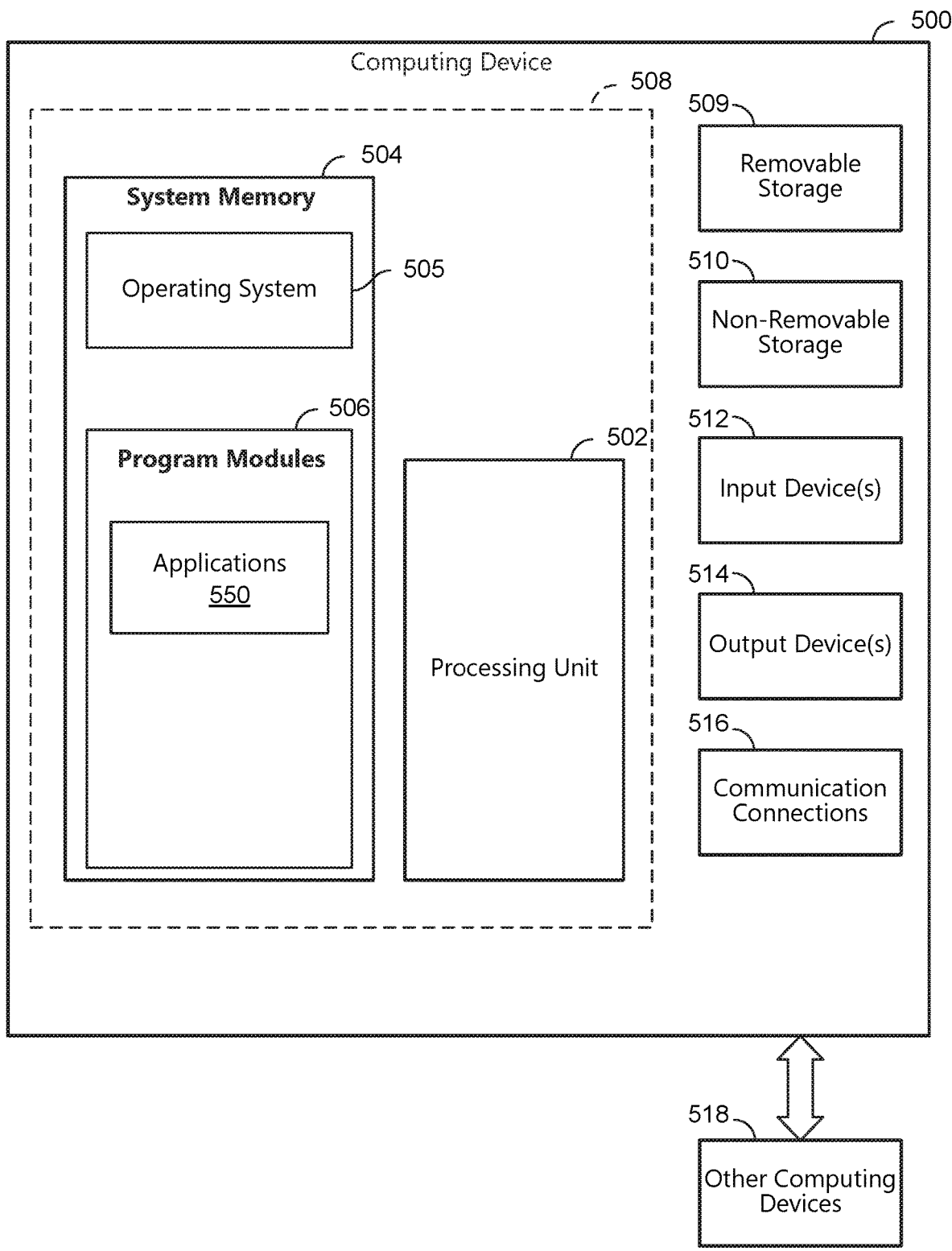
FIG. 5 is a block diagram illustrating example physical components of a computing device.
Figure 6A:
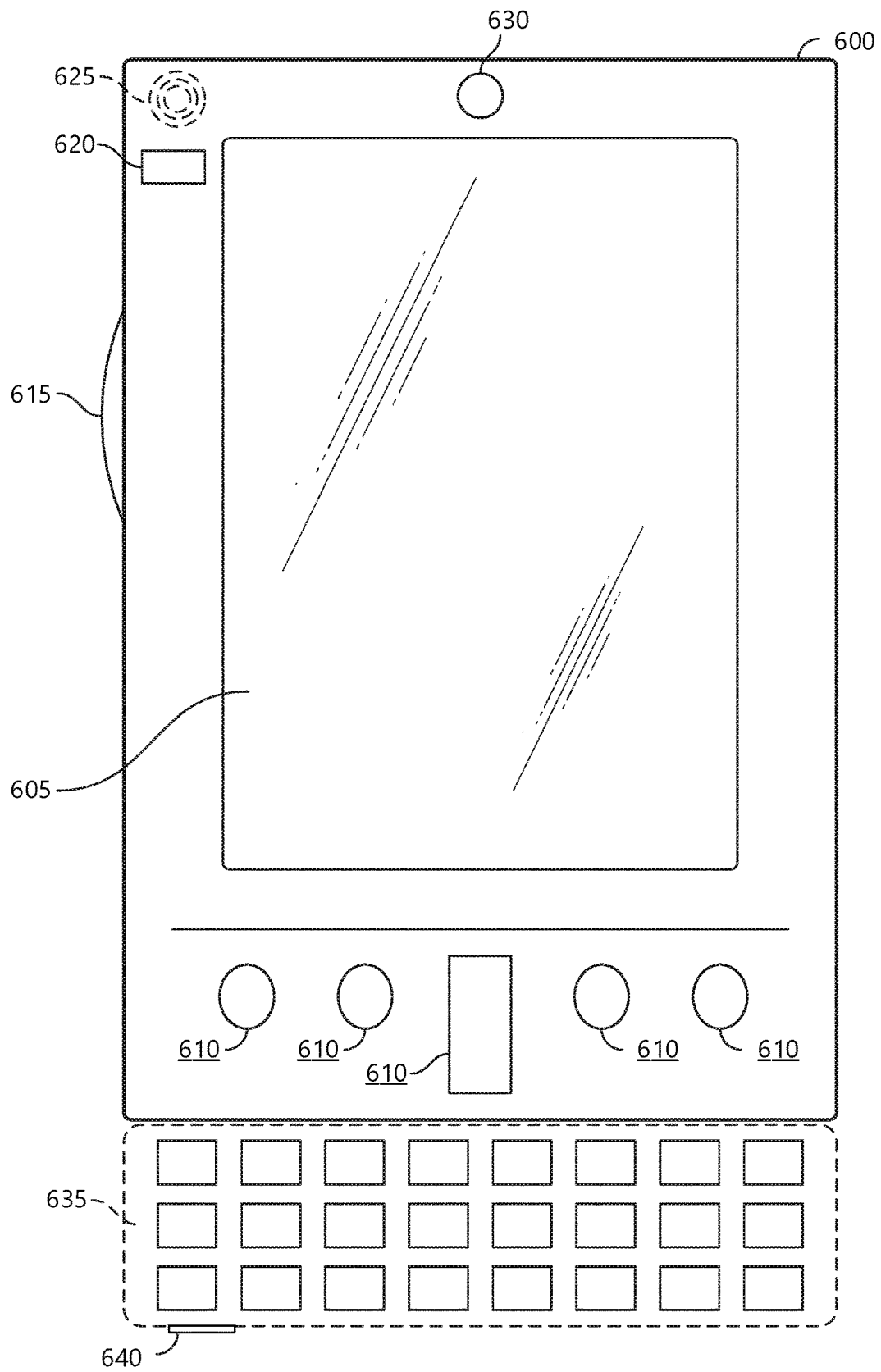
FIGS. 6A and 6B are block diagrams of a mobile computing device.
Figure 6B:
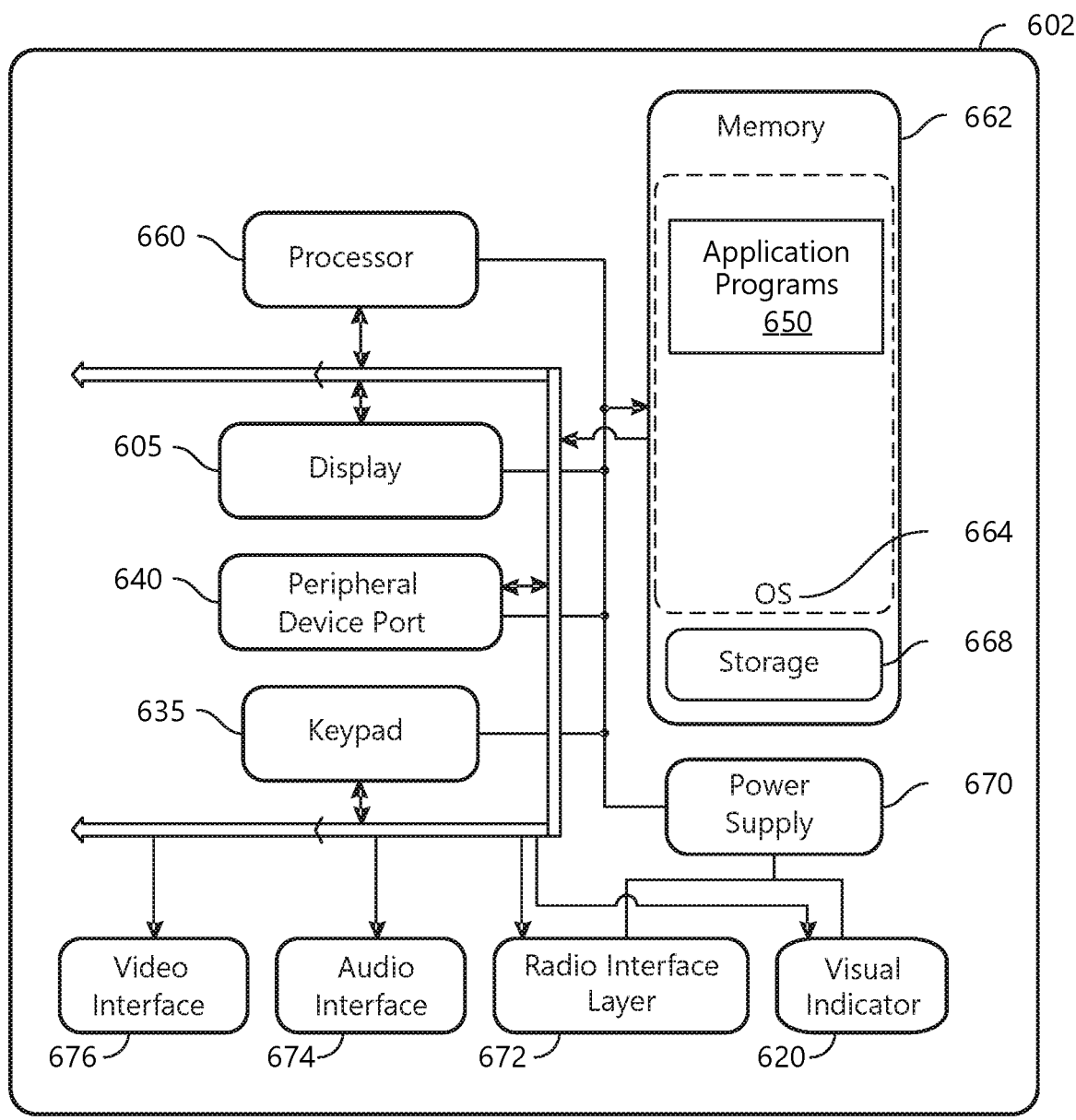

FIGS. 5-6B and the associated descriptions provide a discussion of a variety of operating environments in which examples are practiced. However, the devices and systems illustrated and discussed with respect to FIGS. 5-6B are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 perform processes including, but not limited to, one or more of the stages of the methods 300 and 400 illustrated in FIGS. 3 and 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing clients with transformed images over a content distribution network (CDN), comprising:
   receiving, at a content distribution network (CDN), an original image and a request from a client device for a transformed image based on the original image;
   determining whether the CDN stores the transformed image; and
   in response to determining that the CDN does not store the transformed image:
   transmitting the request from the CDN to an image transformation service;
   receiving, at the CDN from the image transformation service, a request for the original image;
   transmitting, from the CDN to the image transformation service, the original image;
   receiving, at the CDN from the image transformation service, the transformed image based on the original image and the request; and
   transmitting the transformed image from the CDN to the client device.

2. The method of claim 1, further comprising:
   in response to determining that the CDN stores the transformed image, transmitting the transformed image to the client device.

3. The method of claim 1, further comprising:
   in response to determining that the CDN does not store the transformed image, determining whether the CDN stores the original image;
   in response to determining that the CDN does not store the original image, requesting the original image from a client-preferred content source;
   receiving, at the CDN, the original image from the content source;
   transmitting, from the CDN to the image transformation service, the received original image;
   receiving, at the CDN from the image transformation service, the transformed image based on the received original image and the request; and
   transmitting the transformed image from the CDN to the client device.

4. The method of claim 1, further comprising performing a modification on the original image to create the transformed image based on the request.

5. The method of claim 1, wherein the image transformation service is configured to modify the original image to the transformed image based on the request.

6. The method of claim 1, wherein the image transformation service is configured to apply at least one transformation effect to the original image.

7. The method of claim 1, wherein the request for the transformed image includes multiple transformations to apply to the original image.

8. The method of claim 1, further comprising:
   in response to determining that the CDN does not store the transformed image, determining whether the CDN stores an intermediary transformed image, wherein the intermediary transformed image is based on the original image;
   in response to determining that the CDN stores the intermediary transformed image:
   transmitting the intermediary transformed image and the request from the CDN to the image transformation service;

receiving, at the CDN from the image transformation service, the transformed image based on the intermediary transformed image and the request; and transmitting the transformed image from the CDN to the client device.

9. A system for providing clients with transformed images over a content distribution network (CDN), the system comprising:

one or more processing units; and a computer-readable storage medium having encoded thereon computer-executable instructions to cause the one or more processing units to perform a method comprising:

receiving, at a content distribution network (CDN), an original image and a request from a client device for a transformed image based on the original image;

determining whether the CDN stores the transformed image; and in response to determining that the CDN does not store the transformed image:

transmitting the request from the CDN to an image transformation service;

receiving, at the CDN from the image transformation service, a request for the original image;

transmitting, from the CDN to the image transformation service, the original image;

receiving, at the CDN from the image transformation service, the transformed image based on the original image and the request; and transmitting the transformed image from the CDN to the client device.

10. The system of claim 9, wherein the method further comprises:

in response to determining that the CDN stores the transformed image, transmitting the transformed image to the client device.

11. The system of claim 9, wherein the method further comprises performing a modification on the original image to create the transformed image based on the request.

12. The system of claim 9, wherein the method further comprises:

in response to determining that the CDN does not store the transformed image, determining whether the CDN stores the original image;

in response to determining that the CDN does not store the original image, requesting the original image from a client-preferred content source;

receiving, at the CDN, the original image from the content source;

transmitting, from the CDN to the image transformation service, the received original image;

receiving, at the CDN from the image transformation service, the transformed image based on the received original image and the request; and transmitting the transformed image from the CDN to the client device.

13. The system of claim 9, wherein the image transformation service is configured to modify the original image to the transformed image based on the request.

14. The system of claim 9, wherein the image transformation service is configured to apply at least one transformation effect to the original image.

15. The system of claim 9, wherein the request for the transformed image includes multiple transformations to apply to the original image.

16. The system of claim 9, wherein the method further comprises:

in response to determining that the CDN does not store the transformed image, determining whether the CDN stores an intermediary transformed image, wherein the intermediary transformed image is based on the original image;

in response to determining that the CDN stores the intermediary transformed image:

transmitting the intermediary transformed image and the request from the CDN to the image transformation service;

receiving, at the CDN from the image transformation service, the transformed image based on the intermediary transformed image and the request; and transmitting the transformed image from the CDN to the client device.

17. The system of claim 9, wherein the method further comprises:

in response to determining that the CDN stores the transformed image, transmitting the transformed image to the client device.

18. The system of claim 9, wherein the method further comprises performing a modification on the original image to create the transformed image based on the request.

19. The system of claim 9, wherein the method further comprises:

in response to determining that the CDN does not store the transformed image, determining whether the CDN stores the original image;

in response to determining that the CDN does not store the original image, requesting the original image from a client-preferred content source;

receiving, at the CDN, the original image from the content source;

transmitting, from the CDN to the image transformation service, the received original image;

receiving, at the CDN from the image transformation service, the transformed image based on the received original image and the request; and transmitting the transformed image from the CDN to the client device.

20. A computer-readable storage medium having encoded thereon computer-executable instructions for providing clients with transformed images over a content distribution network (CDN), wherein the computer-executable instructions cause one or more processing units of a computer to perform a method comprising:

receiving, at a content distribution network (CDN), an original image and a request from a client device for a transformed image based on the original image;

determining whether the CDN stores the transformed image; and in response to determining that the CDN does not store the transformed image:

transmitting the request from the CDN to an image transformation service;

receiving, at the CDN from the image transformation service, a request for the original image;

transmitting, from the CDN to the image transformation service, the original image;

receiving, at the CDN from the image transformation service, the transformed image based on the original image and the request; and transmitting the transformed image from the CDN to the client device.

* * * * *